United States Patent
Williams

(10) Patent No.: US 11,908,438 B2
(45) Date of Patent: Feb. 20, 2024

(54) SYSTEMS, DEVICES, AND METHODS FOR DECOUPLING NOTE VARIATION AND HARMONIZATION IN COMPUTER-GENERATED VARIATIONS OF MUSIC DATA OBJECTS

(71) Applicant: Obeebo Labs Ltd., Waterloo (CA)

(72) Inventor: Colin P. Williams, Half Moon Bay, CA (US)

(73) Assignee: Obeebo Labs Ltd., Waterloo (CA)

( * ) Notice: Subject to any disclaimer, the term of this patent is extended or adjusted under 35 U.S.C. 154(b) by 448 days.

(21) Appl. No.: 17/162,659

(22) Filed: Jan. 29, 2021

(65) Prior Publication Data

US 2021/0241733 A1    Aug. 5, 2021

Related U.S. Application Data

(60) Provisional application No. 62/968,963, filed on Jan. 31, 2020.

(51) Int. Cl.
*G10H 1/00* (2006.01)
*G10H 7/08* (2006.01)
(Continued)

(52) U.S. Cl.
CPC .......... *G10H 1/0025* (2013.01); *G06F 16/65* (2019.01); *G06Q 40/12* (2013.12); *G06Q 50/184* (2013.01);
(Continued)

(58) Field of Classification Search
CPC .. G10H 1/0025; G10H 1/0008; G10H 1/0041; G10H 7/08; G10H 2210/031;
(Continued)

(56) References Cited

U.S. PATENT DOCUMENTS 5,442,129 A * 8/1995 Mohrlok ................ G10H 1/383
84/657
6,103,964 A * 8/2000 Kay ..................... G10H 1/0575
84/DIG. 12

(Continued)

FOREIGN PATENT DOCUMENTS

CA         2990320 C  * 11/2021  ............. A63B 69/00
CN      110211553 A  *  9/2019  ........... G10H 1/0008

(Continued)

*Primary Examiner* — Christina M Schreiber
(74) *Attorney, Agent, or Firm* — Thomas Mahon

(57) ABSTRACT

Computer-based systems, devices, and methods for generating variations of musical compositions are described. Musical compositions stored in digital media include one or more music data object(s) that encode notes. A first set of notes is characterized and a transformation is applied to replace at least one note in the first set of notes with at least one note in a second set of notes. The transformation may explore or call upon the full range of musical notes available without being constrained by conventions of musicality and harmony. For each particular note in the second set of notes that replaces a note in the first set of notes, whether the particular note is in musical harmony with other notes in the music data object is separately assessed and, if not, the particular note is adjusted to bring it into musical harmony with other notes in the music data object.

18 Claims, 6 Drawing Sheets

(51) Int. Cl.
  *G06Q 40/12* (2023.01)
  *G06Q 50/18* (2012.01)
  *G06F 16/65* (2019.01)
(52) U.S. Cl.
  CPC ......... *G10H 1/0008* (2013.01); *G10H 1/0041* (2013.01); *G10H 7/08* (2013.01); *G10H 2210/031* (2013.01); *G10H 2210/056* (2013.01); *G10H 2210/061* (2013.01); *G10H 2210/071* (2013.01); *G10H 2210/111* (2013.01); *G10H 2210/131* (2013.01); *G10H 2210/145* (2013.01); *G10H 2250/005* (2013.01); *G10H 2250/215* (2013.01)
(58) Field of Classification Search
  CPC ....... G10H 2210/056; G10H 2210/061; G10H 2210/071; G10H 2210/111; G10H 2210/131; G10H 2210/145; G10H 2250/005; G10H 2250/215; G06Q 40/12; G06Q 50/184; G06F 16/65
  USPC .......................................................... 84/609
  See application file for complete search history.

(56) References Cited

U.S. PATENT DOCUMENTS

| | | | | |
|---|---|---|---|---|
| 6,121,532 A | * | 9/2000 | Kay | G10H 1/40 84/645 |
| 6,288,315 B1 | * | 9/2001 | Bennett | G09B 15/004 84/471 SR |
| 9,218,748 B2 | * | 12/2015 | Kaipainen | G09B 5/06 |
| 10,629,176 B1 | * | 4/2020 | Williams | G10H 1/0041 |
| 11,024,274 B1 | * | 6/2021 | Williams | G10H 1/0008 |
| 2002/0152877 A1 | * | 10/2002 | Kay | G10H 1/00 84/615 |
| 2010/0224051 A1 | * | 9/2010 | Kurebayashi | G10H 1/22 84/637 |
| 2013/0025437 A1 | * | 1/2013 | Serletic | G10H 1/0025 84/634 |
| 2013/0125732 A1 | * | 5/2013 | Nguyen | G10H 1/0025 84/609 |
| 2014/0053711 A1 | * | 2/2014 | Serletic, II | G09B 15/04 84/613 |
| 2014/0140536 A1 | * | 5/2014 | Serletic, II | G06F 3/0481 381/98 |
| 2019/0196777 A1 | * | 6/2019 | Kovacevic | G06F 3/165 |
| 2020/0312287 A1 | * | 10/2020 | Galuten | G10H 1/06 |
| 2020/0402488 A1 | * | 12/2020 | Williams | G10H 1/0025 |
| 2021/0241730 A1 | * | 8/2021 | Lundquist | G10H 1/0008 |
| 2021/0241731 A1 | * | 8/2021 | Williams | G10H 1/0025 |
| 2021/0241733 A1 | * | 8/2021 | Williams | G06F 16/65 |
| 2021/0241734 A1 | * | 8/2021 | Williams | G06F 16/65 |
| 2021/0241735 A1 | * | 8/2021 | Williams | G10H 7/08 |
| 2022/0415291 A1 | * | 12/2022 | Zuta | G10H 1/38 |
| 2023/0050565 A1 | * | 2/2023 | Huang | G10H 7/08 |

FOREIGN PATENT DOCUMENTS

| | | | | |
|---|---|---|---|---|
| CN | 111863030 A | * | 10/2020 | |
| JP | 5935503 B2 | * | 6/2016 | ........... G09B 15/023 |
| JP | 6690165 B2 | * | 4/2020 | |
| WO | WO-2023074581 A1 | * | 5/2023 | |

* cited by examiner

SYSTEMS, DEVICES, AND METHODS FOR DECOUPLING NOTE VARIATION AND HARMONIZATION IN COMPUTER-GENERATED VARIATIONS OF MUSIC DATA OBJECTS

CROSS-REFERENCE TO RELATED APPLICATION

This application claims the benefit of U.S. Provisional Patent Application Ser. No. 62/968,963, filed Jan. 31, 2020, titled "Systems, Devices, And Methods for Computer-Generated Musical Compositions", the content of which is incorporated herein in its entirety by reference.

TECHNICAL FIELD

The present systems, devices, and methods generally relate to computer-generated music, and particularly relate to decoupling note variation and harmonization when generating variations of music data objects.

BACKGROUND

Description of the Related Art

Composing Musical Compositions

A musical composition may be characterized by sequences of sequential, simultaneous, and/or overlapping notes that are partitioned into one or more tracks. Starting with an original musical composition, a new musical composition or "variation" can be composed by manipulating the "elements" (e.g., notes, bars, tracks, arrangement, etc.) of the original composition. As examples, different notes may be played at the original times, the original notes may be played at different times, and/or different notes may be played at different times. Further refinements can be made based on many other factors, such as changes in musical key and scale, different choices of chords, different choices of instruments, different orchestration, changes in tempo, the imposition of various audio effects, changes to the sound levels in the mix, and so on.

In order to compose a new musical composition (or variation) based on an original or previous musical composition, it is typically helpful to have a clear characterization of the elements of the original musical composition. In addition to notes, bars, tracks, and arrangements, "segments" are also important elements of a musical composition. In this context, the term "segment" (or "musical segment") is used to refer to a particular sequence of bars (i.e., a subset of serially-adjacent bars) that represents or corresponds to a particular section or portion of a musical composition. A musical segment may include, for example, an intro, a verse, a pre-chorus, a chorus, a bridge, a middle8, a solo, or an outro. The section or portion of a musical composition that corresponds to a "segment" may be defined, for example, by strict rules of musical theory and/or based on the sound or theme of the musical composition.

BRIEF SUMMARY

A computer-implemented method of generating a variation of a music data object may be summarized as including: characterizing a first set of notes in the music data object; and applying a transformation to the first set of notes in the music data object, wherein the transformation maps at least one note in the first set of notes to at least one note in a second set of notes, and wherein applying the transformation to the first set of notes in the music data object includes replacing, in the music data object, at least one note in the first set of notes with at least one note in the second set of notes in accordance with the transformation that maps at least one note in the first set of notes to at least one note in a second set of notes. Applying a transformation to the first set of notes in the music data object may include applying, to the first set of notes in the music data object, a transformation that treats respective notes in the first set of notes independently of one another and, for each mapping of a particular note in the first set of notes, does not take into account any other note that neighbors the particular note in the music data object. Applying a transformation to the first set of notes in the music data object may include applying, to the first set of notes in the music data object, a transformation that ignores conventions of musicality and harmony.

Characterizing a first set of notes in the music data object may include characterizing a first set of unique notes in the music data object.

Applying a transformation to the first set of notes in the music data object may include: applying, to the first set of notes in the music data object, a transformation that maps each respective unique note in the first set of notes to a respective unique note in the second set of notes; and/or applying, to the first set of notes in the music data object, a transformation that maps at least two respective unique notes in the first set of notes to a same note in the second set of notes; and/or applying, to the first set of notes in the music data object, a transformation that maps each of at least two respective instances of a same note in the first set of notes to a respective unique note in the second set of notes; and/or applying, to the first set of notes in the music data object, a transformation that maps at least one note in the first set of notes to at least two respective unique notes in the second set of notes.

Each respective note in the second set of notes may be included in the first set of notes.

The method may further include harmonizing the at least one note in the second set of notes that replaces, in the music data object, at least one note in the first set of notes. Harmonizing the at least one note in the second set of notes that replaces, in the music data object, at least one note in the first set of notes may include, for each particular note in the second set of notes that replaces, in the music data object, at least one note in the first set of notes: assessing whether the particular note is in musical harmony with other notes that temporally coincide with the particular note in the music data object and, if the particular note is not in musical harmony with other notes that temporally coincide with the particular note in the music data object, adjusting the particular note to a nearest note that is in musical harmony with other notes that temporally coincide with the particular note in the music data object; and/or assessing whether the particular note is in musical harmony with other notes that neighbor the particular note in the music data object and, if the particular note is not in musical harmony with other notes that neighbor the particular note in the music data object, adjusting the particular note to a nearest note that is in musical harmony with other notes that neighbor the particular note in the music data object.

Harmonizing the at least one note in the second set of notes that replaces, in the music data object, at least one note in the first set of notes may include applying conventions of musicality and harmony to the at least one note in the second set of notes that replaces, in the music data object, at least one note in the first set of notes, based at least in part on a placement, in relation to other notes in the music data object, of the at least one note in the second set of notes that replaces, in the music data object, at least one note in the first set of notes.

The method may further include encoding the variation of the music data object with at least one note in the second set of notes in place of at least one note in the first set of notes in accordance with the transformation that maps at least one note in the first set of notes to at least one note in a second set of notes. The music data object may be selected from a group consisting of: a bar data object, a track data object, a segment data object, and a Music[Segments{ }, barsPerSegment{ }] data object.

A system for generating a variation of a music data object may be summarized as including: at least one processor; and a non-transitory processor-readable storage medium communicatively coupled to the at least one processor, the non-transitory processor-readable storage medium storing the music data object and processor-executable instructions and/or data that, when executed by the at least one processor, cause the at least one processor to: characterize a first set of notes in the music data object; and apply a transformation to the first set of notes in the music data object, wherein the transformation maps at least one note in the first set of notes to at least one note in a second set of notes, and wherein the processor-executable instructions and/or data that, when executed by the at least one processor, cause the at least one processor to apply a transformation to the first set of notes in the music data object, cause the at least one processor to replace, in the music data object, at least one note in the first set of notes with at least one note in the second set of notes in accordance with the transformation that maps at least one note in the first set of notes to at least one note in a second set of notes.

The processor-executable instructions and/or data, when executed by the at least one processor, may further cause the at least one processor to harmonize the at least one note in the second set of notes that replaces, in the music data object, at least one note in the first set of notes. The processor-executable instructions and/or data that, when executed by the at least one processor, cause the at least one processor to apply a transformation to the first set of notes in the music data object, may cause the at least one processor to apply, to the first set of notes in the music data object, a transformation that treats respective notes in the first set of notes independently of one another and, for each mapping of a particular note in the first set of notes, does not take into account any other note that neighbors the particular note in the music data object. The processor-executable instructions and/or data that, when executed by the at least one processor, cause the at least one processor to harmonize the at least one note in the second set of notes that replaces, in the music data object, at least one note in the first set of notes, may cause the at least one processor to, for each particular note in the second set of notes that replaces, in the music data object, at least one note in the first set of notes, assess whether the particular note is in musical harmony with all other notes that neighbor the particular note in the music data object and, if the particular note is not in musical harmony with all other notes that neighbor the particular note in the music data object, adjust the particular note to a nearest note that is in musical harmony with all other notes that neighbor the particular note in the music data object.

A computer program product for generating a variation of a music data object may be summarized as including: processor-executable instructions and/or data that, when the computer program product is stored in a non-transitory processor-readable storage medium and executed by at least one processor communicatively coupled to the non-transitory processor-readable storage medium, cause the at least one processor to: characterize a first set of notes in the music data object; and apply a transformation to the first set of notes in the music data object, wherein the transformation maps at least one note in the first set of notes to at least one note in a second set of notes, and wherein the processor-executable instructions and/or data that, when executed by the at least one processor, cause the at least one processor to apply a transformation to the first set of notes in the music data object, cause the at least one processor to replace, in the music data object, at least one note in the first set of notes with at least one note in the second set of notes in accordance with the transformation that maps at least one note in the first set of notes to at least one note in a second set of notes. The computer program product may further include processor-executable instructions and/or data that, when executed by the at least one processor, cause the at least one processor to harmonize the at least one note in the second set of notes that replaces, in the music data object, at least one note in the first set of notes.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
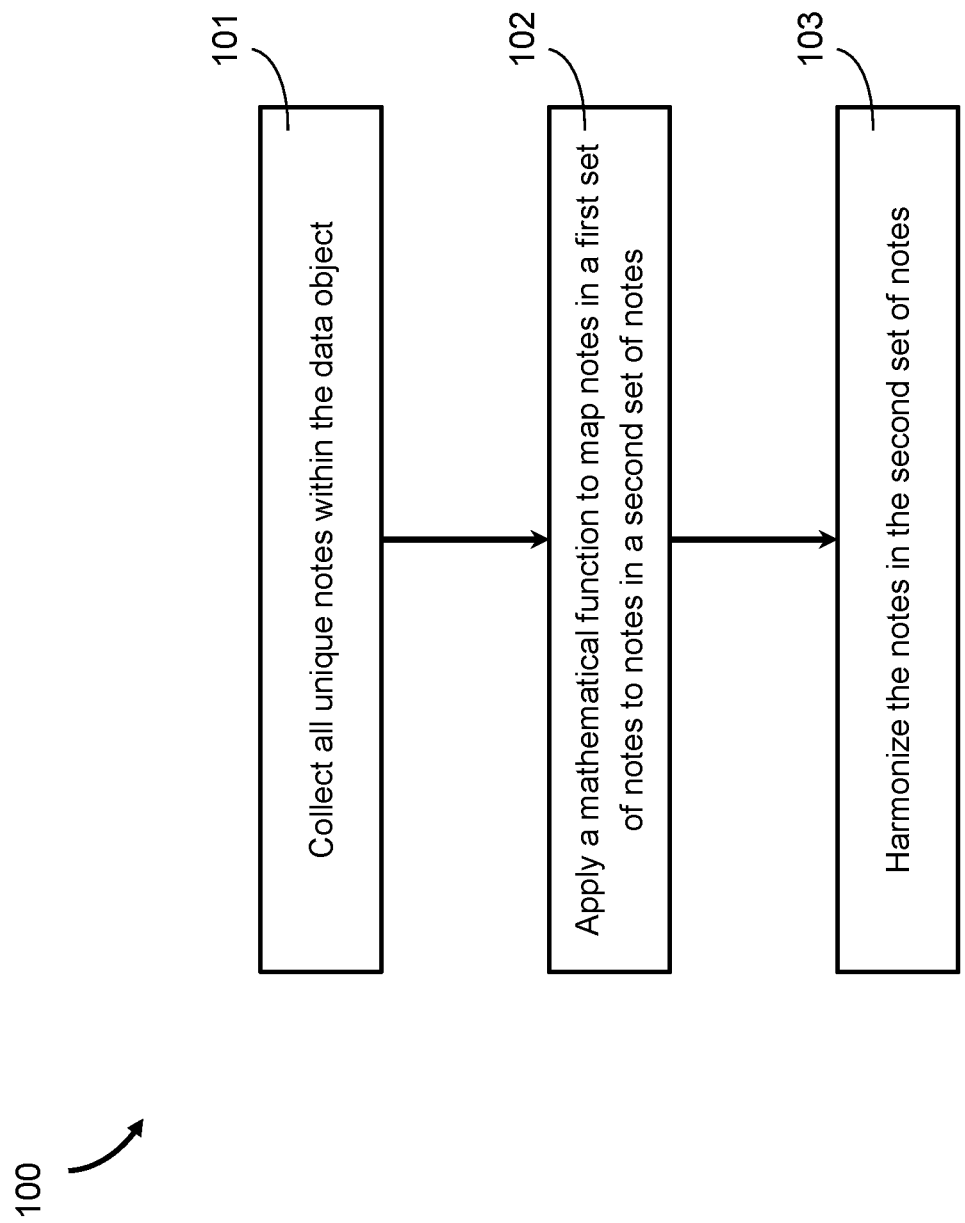
FIG. 1 is a flow diagram showing an exemplary computer-implemented method of varying (e.g., applying a note variation to) a music data object in accordance with the present systems, devices, and methods.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide systems, devices, and methods for generating one or more variations of a musical composition by deploying algorithms that decouple note variation and harmonization. Conventionally, a variation of a musical composition is produced by, for example, swapping out an existing musical element for a new musical element (such as swapping out an existing note for a new note), where the new musical element (e.g., new note) must satisfy certain constraints of musicality and harmony that take into account any/all temporally coincident musical elements (e.g., temporally coincident notes) and neighboring musical elements (e.g., neighboring notes). The conventional requirement of satisfying such constraints reduces the freedom and expressibility of the variation relative to the original musical composition. For example, if the temporally coincident notes and neighbor notes are all in a particular key, such as C-major, then any new note applied in a variation would conventionally be constrained to be in the key of C-major. However, in accordance with the present systems, devices, and methods, a variation may advantageously be made "unconstrained" by removing the requirement that any changes to the original musical composition satisfy conventional rules of musicality and harmony. Instead, the present systems, devices, and methods provide algorithms that exploit the freedom to vary musical elements without constraint and subsequently apply harmonization adjustments to the variations, if desired.

Systems, devices, and methods for encoding musical compositions in hierarchical data structures of the form Music[Segments{ }, barsPerSegment{ }] are described in U.S. Pat. No. 10,629,176, filed Jun. 21, 2019 and entitled "Systems, Devices, and Methods for Digital Representations of Music," which is incorporated by reference herein in its entirety.

Systems, devices, and methods for automatically identifying the musical segments of a musical composition and which can facilitate encoding musical compositions (or even simply undifferentiated sequences of musical bars) into the Music[Segments{ }, barsPerSegment{ }] form described above are described in U.S. patent application Ser. No. 16/775,241, filed Jan. 28, 2020 and entitled "Systems, Devices, and Methods for Segmenting a Musical Composition into Musical Segments," which is incorporated herein by reference in its entirety.

Systems, devices, and methods for identifying harmonic structure in digital data structures and for mapping the Music[Segments{ }, barsPerSegment{ }] data structure into an isomorphic HarmonicStructure[Segments{ }, harmonicSequencePerSegment{ }] data structure are described in US Patent Publication No. 2020-0402488, filed Jan. 28, 2020 and entitled "Systems, Devices, and Methods for Harmonic Structure in Digital Representations of Music," which is incorporated herein by reference in its entirety.

The various embodiments described herein include systems, devices, and methods for, among other things, using Music[Segments{ }, barsPerSegment{ }] data structures and HarmonicStructure[Segments{ }, harmonicSequencePerSegment{ }] data structures to create, compose, and/or generate variations of the note sequences within the musical bars (i.e., within the bar data objects encoded in the data structures) and thereby generate: i) new musical compositions that are variations on an original musical composition; and/or ii) new musical compositions that are, for all intents and purposes, original musical compositions.

The present systems, devices, and methods employ at least four fundamental types of note variation. The Music [Segments{ }, barsPerSegment{ }] data structure represents music according to one or a multiplicity of tracks (e.g., track data objects) and one or a multiplicity of segments (e.g., segment data objects). In principle, any note variation may be applied to each track independently of the note variation applied to the other tracks, i.e., a note variation may be applied "locally" or "Within Tracks," or a note variation may be applied consistently across all tracks, i.e., a note variation may be applied "globally" or "Across Tracks". Similarly, in principle any note variation may be applied to each segment independently of the note variation applied to the other segments, i.e., a note variation may be applied locally or "Within Segments", or a note variation may be applied consistently across all segments, i.e., a note variation may be applied "globally" or "Across Segments." Thus, the at least four fundamental types of note variation described above include note variations that are: i) "Within Tracks Within Segments", ii) "Within Tracks Across Segments", iii) "Across Tracks Within Segments", and iv) "Across Tracks Across Segments."

Throughout this specification and the appended claims, reference is often made to a "data object." Unless the specific context requires otherwise, the term "data object" is used herein to refer to a collection or set of data that is combined or amalgamated into a discretely addressable object. A data object may exist in the source code, object code, computer code, and/or program code of a computing environment where it is defined, interpreted, and manipulated, and a data object may have an analog or physical counterpart in the non-transitory processor-readable storage medium where it is stored and called or operated upon. In this case, "encoding" a component of a musical composition in a data object may include writing, by at least one processor, the component to the data object in the non-transitory processor-readable storage medium and/or forming, by at least one processor, the component(s) in the data object stored in the non-transitory processor-readable storage medium. One data object may include (e.g., contain, encompass, reference, or invoke) one or more additional data object(s).

Throughout this specification and the appended claims, unless the specific context requires otherwise the general term "music data object" is used to refer to any (either individually or in multiplicity) of the different types of data objects that are used to encode digital music, including but not limited to those that are encoded (or may be encoded) in a Music[Segments{ }, barsPerSegment{ }] data structure and/or in a HarmonicStructure[Segments{ }, harmonicSequencePerSegment{ }] data structure, such as a bar data object, a track data object, a segment data object, and/or a Music[ ] data object. Thus, unless the specific context requires otherwise, reference to a note variation being applied to or within a "data object" is generally applicable to all such data object types. Furthermore, the significance or impact a note variation has on an overall musical composition may depend on the scale of the music data object to which it is applied (e.g., a note variation applied in one bar data object may be less significant or impactful than a note variation applied across an entire segment data object).

In accordance with the present systems, devices, and methods, the various implementations of creating note variations described herein are not initially constrained to be musical. That is, in the absence of further adjustment an application of any of the disclosed note variation systems, devices, and/or methods described herein to a music data object may initially produce a result that is not aesthetically pleasing, musically-speaking, when the modified data object is "sonified". This gives the note variation systems, devices, and methods described herein considerable liberty, with the note variations themselves cast as mathematical or computational operations without regard to musicality. However, the various implementations described herein also provide systems, devices, and methods for (re-)harmonizing an otherwise unmusical set of notes, which may, in some implementations, be applied after a music data object has had one or more note variation(s) applied thereto. This decoupling between note variation and harmonization allows an enormous range of note variation to be explored without harmonic constraint and yet still ensures that the end result will be harmonically aesthetically pleasing to a listener.

The term "sonify" is used herein in relation to music data objects and/or digital music files to mean "convert into audio form". Thus, when a data object or digital music file is "played" in the colloquial sense, the result is the sonification of the musical information encoded in the music data object and/or digital music file.

Figure 6:
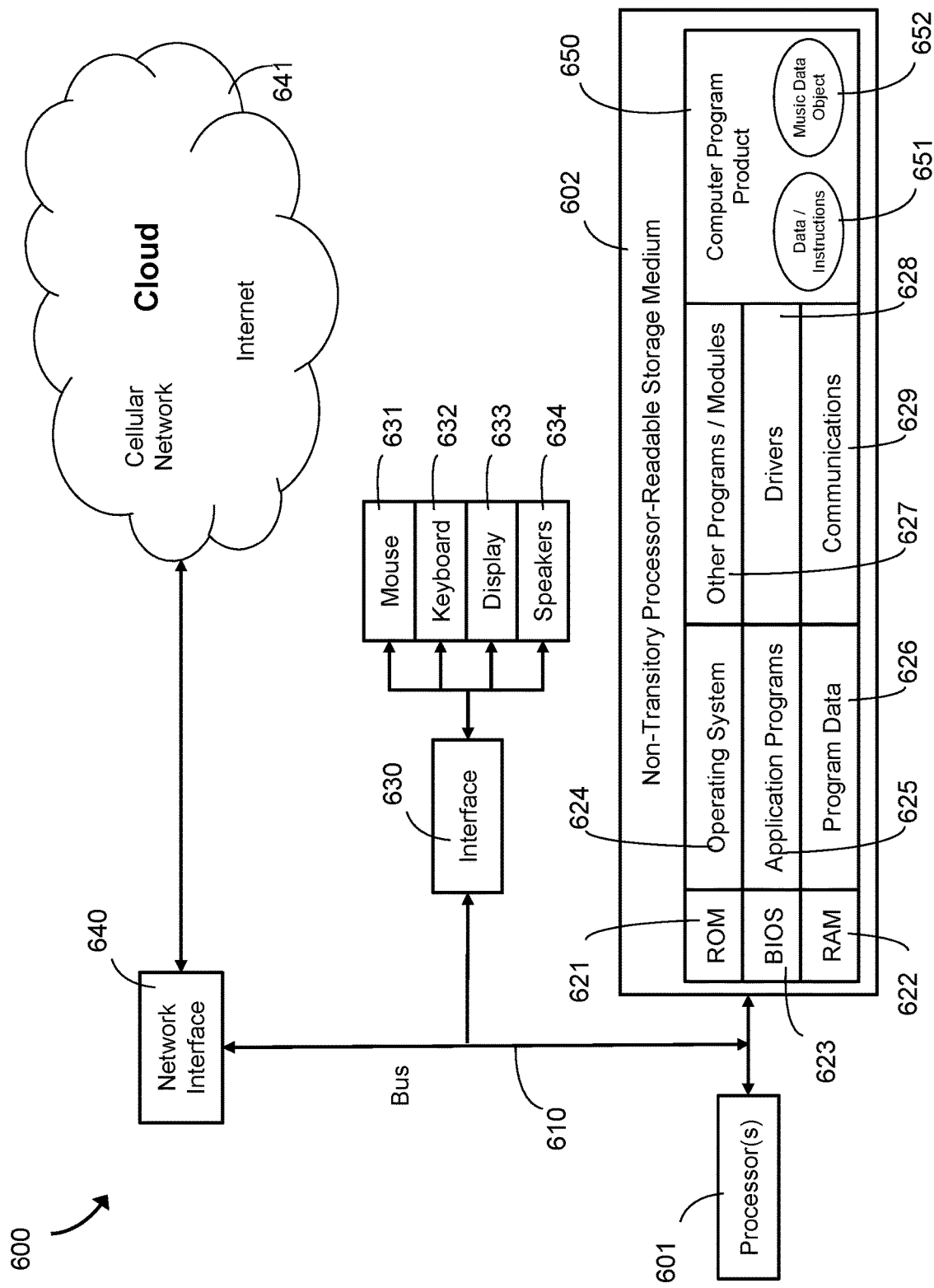
FIG. 6 is an illustrative diagram of a processor-based computer system suitable at a high level for performing the various computer-implemented methods described in the present systems, devices, and methods.

FIG. 1 is a flow diagram showing an exemplary computer-implemented method 100 of varying (e.g., applying a note variation to) a music data object in accordance with the present systems, devices, and methods. In general, throughout this specification and the appended claims, a computer-implemented method is a method in which the various acts are performed by one or more processor-based computer system(s). For example, certain acts of a computer-implemented method may be performed by at least one processor communicatively coupled to at least one non-transitory processor-readable storage medium or memory (hereinafter referred to as a non-transitory processor-readable storage medium) and, in some implementations, certain acts of a computer-implemented method may be performed by peripheral components of the computer system that are communicatively coupled to the at least one processor, such as interface devices, sensors, communications and networking hardware, and so on. The non-transitory processor-readable storage medium may store data and/or processor-executable instructions that, when executed by the at least one processor, cause the computer system to perform the method and/or cause the at least one processor to perform those acts of the method that are performed by the at least one processor. FIG. 6 and the written descriptions thereof provide illustrative examples of computer systems that are suitable to perform the computer-implemented methods described herein.

Returning to FIG. 1, method 100 includes three acts 101, 102, and 103, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 101, all the unique notes within the music data object are collected or identified, e.g., by at least one computer processor. In general, the collection of unique notes may include several notes of the same and/or differing types in one or a multiplicity of octaves.

At 102, a mathematical function is applied (e.g., by at least one processor) to map notes in a first set of notes in the collection of notes identified at 101 to notes in a second set of notes. The mathematical function may come in a wide variety of different forms depending on the specific implementation. In accordance with the present systems, devices, and methods, the mathematical function may come in at least one of the three forms of mathematical functions (i.e., Function A, Function B, and/or Function C) described below.

Function A

Function A maps a first set of notes (from the music data object) onto a second set of notes (also from the music data object), where the second set of notes has cardinality equal to that of the first set of notes. Function A may include one of a multiplicity of permutations of the first set of notes. As such, Function A may include a bijective function (i.e., one to one and onto) or, equivalently, a function that is both injective and surjective. This may help ensure that a given note of the first set of notes is mapped to a consistent note in the second set of notes, and that no other note from the first set of notes is also mapped to this same note from the second set of notes, nor are any of the notes from the first set of notes absent from the second set of notes. Any permutation may be used, including random permutations and localized cyclic permutations. In various implementations, Function A may include any bijective function on sets of notes to sets of notes, such as a bijective function that maps a first set of notes (derived from the music data object) to a second set of notes (of cardinality equal to the first set of notes) whose notes need not necessarily be derived from those in the music data object.

Function B

Function B maps a first set of notes (from the music data object) onto a second set of notes (not necessarily all from the music data object), where the second set of notes has cardinality that may be equal to or less than that of the first set of notes. In some implementations, Function B may be any surjective function, such as a surjective function that allows different notes from the first set of notes to map to the same note in the second set of notes.

Function C

Function C maps all notes of the same type in a first set of notes to notes of the same type (but possibly different octaves) in a second set of notes. Function C may, in some implementations, realize a special case of Function B wherein the Function B is constrained to map note types consistently. For example, all "Eb" notes may map only to "A #" notes, etc. The octaves may be the same, but are not necessarily constrained to be the same.

In accordance with the present systems, devices, and methods, the mathematical function that is applied (e.g., by at least one processor) at 102 ignores (or otherwise does not take into account) conventions of musicality and harmony in the mappings between notes. In other words, the mathematical function maps notes in the first set of notes to notes in the second set of notes on an individual, note-by-note basis and, for each particular note mapping, ignores (or otherwise does not take into account) the relative placement of the particular note in the musical composition or the other notes that temporally coincide with and neighbor the particular note.

At 103, the notes in the second set of notes are harmonized (e.g., by at least one processor) to improve the overall aesthetic quality exhibited when the music data object that has been transformed (e.g., varied) by method 100 is sonified.

Figure 2:
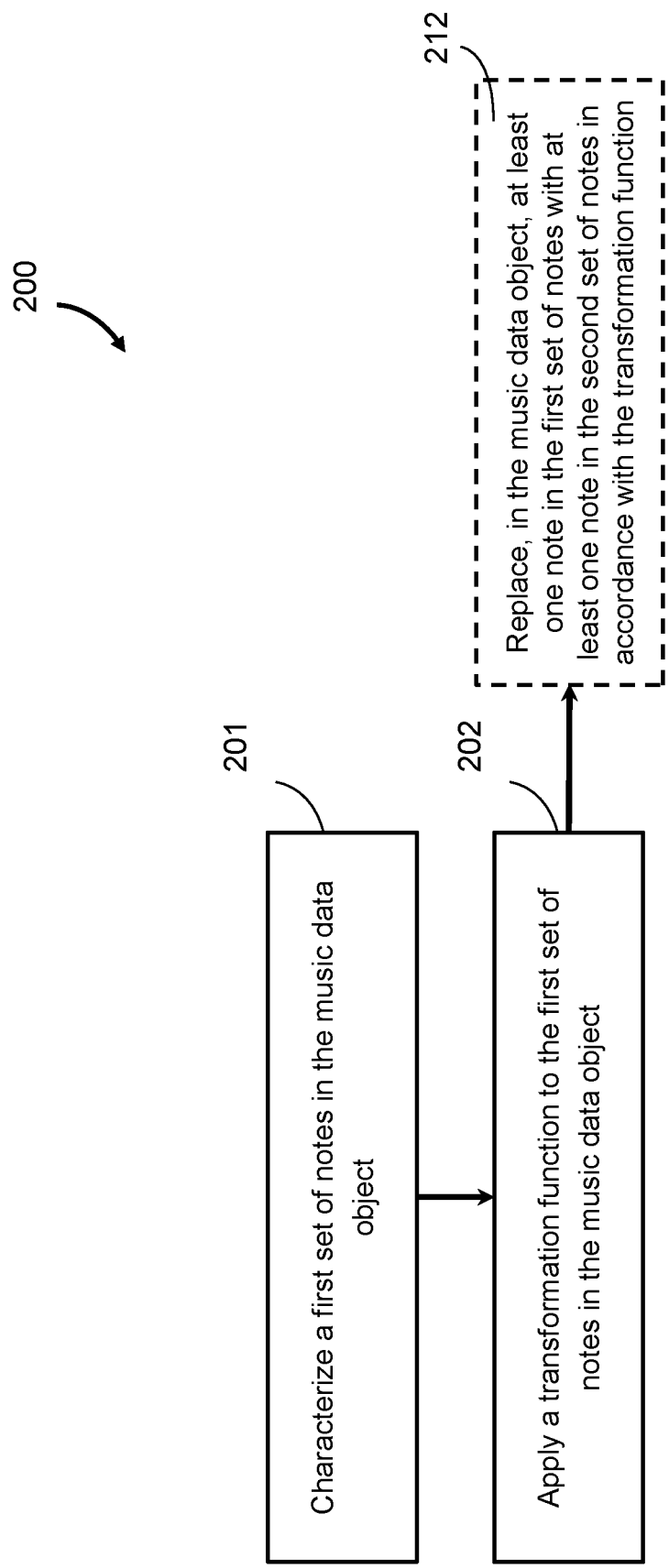
FIG. 2 is a flow diagram showing an exemplary computer-implemented method of generating a variation of a music data object in accordance with the present systems, devices, and methods.

FIG. 2 is a flow diagram showing an exemplary computer-implemented method 200 of generating a variation of a music data object in accordance with the present systems, devices, and methods. Method 200 includes two acts 201 and 202, and one sub-act 212, though those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations.

At 201, a first set of notes in the music data object is characterized. As previously described, the music data object may be any data object used to encode digital music, including without limitation: a digital music file (e.g., .mp3, .mid, .wav, .mp4a, or the like), a bar data object, a track data object, a segment data object, and a Music[Segments { }, barsPerSegment{ }] data object. The music data object may be stored in a non-transitory processor-readable storage medium that is communicatively coupled to at least one processor, and at 201 the first set of notes may be characterized by the at least one processor.

Throughout this specification and the appended claims, the term "characterize", and related variants such as "characterized" and "characterizing", are used in a general sense to refer to an action or process through which items or objects are collected, organized, listed, indexed, pointed to, or otherwise identified. Thus, characterizing a first set of notes in a music data object may mean generally directing attention to the first set of notes in the music data object by, depending on the specific implementation, collecting, organizing, listing, indexing, pointing to, or otherwise identifying the first set of notes in the music data object. Depending on the specific implementation, characterizing the first set of notes in the music data object at 201 may include characterizing all notes in the music data object or characterizing a subset of notes in the music data object. As an example of characterizing a subset of notes in the music data object, characterizing a first set of notes in the music data object may include characterizing a first set of unique notes in the music data object, where the first set of unique notes may include all of the unique notes in the music data object or a subset of all of the unique notes in the music data object.

Throughout this specification and the appended claims, the term "unique note" is generally used to refer to any musical note that is distinct from other musical notes. The extent to which a note is unique or distinct from other musical notes may depend on the specific implementation. For example, a set comprising the ten notes [C, C, A, E, A, F, G, G, C, A] has five unique notes [C, A, E, F, G]. In the preceding example, the set comprising ten notes is "octave-less" in the sense that it does not include any octave information. In some implementations of the present systems, devices, and methods, notes may be treated as octave-less by omitting or ignoring any octave information and unique notes may simply correspond to notes that have different "names" (i.e., A, B, E, etc.). In other implementations of the present systems, devices, and methods, notes may be treated as "octaved" in the sense that octave information is included and taken into account. In such "octaved" implementations, unique notes may include notes having the same name in different octaves. For example, if octave information is added to the same exemplary set of ten notes, as in [C3, C3, A3, E4, A4, F2, G5, G4, C2, A4], then a larger set of eight unique notes may be extracted, namely, [C3, A3, E4, A4, F2, G5, G4, C2]. In some "octaved" implementations, the term "unique note" may refer to any musical note that is distinct in pitch/frequency relative to other notes.

Returning to FIG. 2, at 202 a transformation that maps at least one note in the first set of notes to at least one note in a second set of notes is applied (e.g., by at least one processor) to the first set of notes in the music data object. Generally, applying the transformation at 202 further includes sub-act 212. At 212, at least one note in the first set of notes in replaced, in the music data object, with at least one note in the second set of notes in accordance with the transformation. In other words, applying (at 202) the transformation to the first set of notes in the music data object includes replacing (at 212) at least one note in the first set of notes with at least one note in the second set of notes in accordance with the mapping defined or dictated by the transformation. By this/these replacement(s), the variation of the music data object is generated.

The nature, form, result, and/or effect of the transformation, and of the note-mapping defined or dictated thereby, may depend on the specific implementation of the present systems, devices, and methods. The mathematical functions described in relation to method 100 are non-limiting examples of transformations in accordance with the present systems, devices, and methods. More generally, some additional examples of transformations that may be applied to the first set of notes in the music data object at 202 include, without limitation:

a transformation that maps each respective unique note in the first set of notes to a respective unique note in the second set of notes (e.g., a transformation that effects a 1:1 mapping between unique notes in the first set of notes and unique notes in the second set of notes, such as C→E and B3→D4, and the like);

a transformation that maps at least two respective unique notes in the first set of notes to a same note in the second set of notes (e.g., a transformation that effects N:1 mapping between N unique notes in the first set of notes and 1 note in the second set of notes, where N=2 is this example, such as C→G and E→G);

a transformation that maps each of at least two respective instances of a same note in the first set of notes to a respective unique note in the second set of notes (e.g., a transformation that effects 1:M mapping between 1 note in the first set of notes and M unique notes in the second set of notes, where M=2 in this example, such as C→E and C→G); and/or a transformation that maps at least one note in the first set of notes to at least two respective unique notes in the second set of notes, such as C→EG.

Furthermore, the number of notes affected by the transformation may vary across different implementations of the present systems, devices, and methods. In the list of exemplary transformations above, example mappings such "C→G and E→G" are provided for illustrative purposes only. In practice, the first set of notes may include any number of notes, such as 1, 88 (i.e., the number of keys on a typical piano), any number in between 1 and 88, or a number greater than 88. In other words, the cardinality of the first set of notes may vary across different implementations of the present systems, devices, and methods depending on, among other things, the extent to which the variation is to differ from the original music data object. Depending on the implementation and, at least in part, on the nature, form, result, or effect of the transformation being applied, the cardinality of the second set of notes may be less than, equal to, or greater than the cardinality of the first set of notes. In some implementations, each respective note in the second set of notes may be included in the first set of notes.

Figure 3:
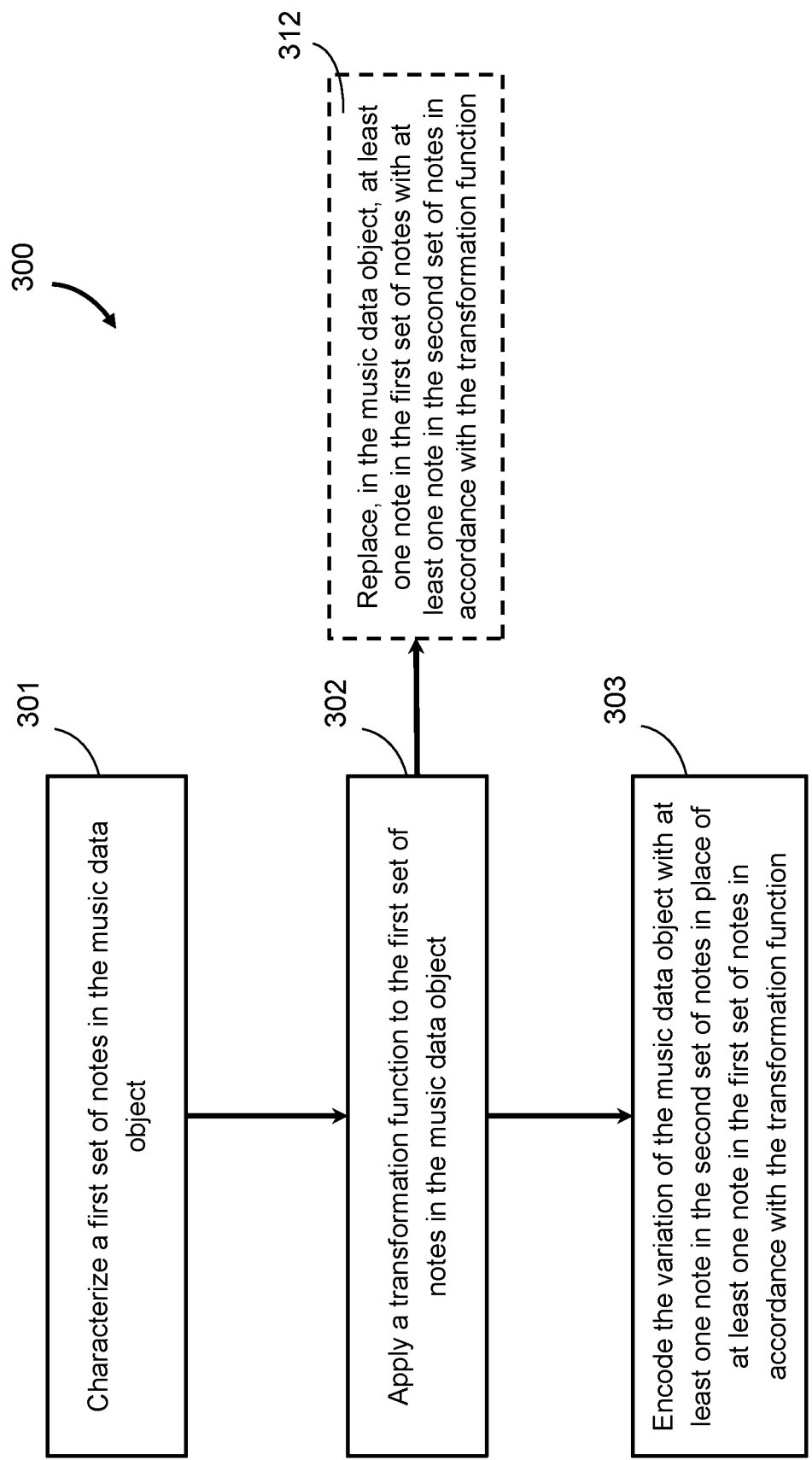
FIG. 3 is a flow diagram showing another exemplary computer-implemented method of generating a variation of a music data object in accordance with the present systems, devices, and methods.

FIG. 3 is a flow diagram showing another exemplary computer-implemented method 300 of generating a variation of a music data object in accordance with the present systems, devices, and methods. Method 300 includes all of the acts and sub-acts of method 200 as well as at least one additional act. That is, method 300 includes act 301 that is substantially the same as act 201 from method 200 and act 302 that is substantially the same as act 202 from method 200, and act 302 of method 300 also includes sub-act 312 that is substantially the same as sub-act 212 of act 202 from method 200. However, method 300 also includes act 303 that is not included in method 200. Thus, method 300 includes three acts 301, 302, and 303, and one sub-act 312, though those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations.

At 301, a first set of notes in the music data object is characterized substantially as described in relation to act 201 of method 200.

At 302, a transformation is applied to the first set of notes in the music data object substantially as described in relation to act 202 of method 200.

At 312, at least one note in the first set of notes is replaced, in the music data object, with at least one note in the second set of notes in accordance with the transformation substantially as described in relation to sub-act 212 of method 200.

At 303, the variation of the music data object that results from acts 301 and 302 (including sub-act 312) is encoded with at least one note in the second set of notes in place of at least one note in the first set of notes in accordance with the transformation. In some implementations, encoding the variation of the music data object may include writing (or overwriting), by at least one processor, the variation to the music data object in a non-transitory processor-readable storage medium and/or forming, by at least one processor, the variation in the music data object stored in a non-transitory processor-readable storage medium.

As previously described, the various implementations of creating note variations described herein are not initially constrained to be musical. More specifically, the transformation that is applied to the first set of notes at 202 of method 200, at 302 of method 300, and at 402 of method 400 is not necessarily constrained to account for the musical/harmony context or musical/harmony consequences of mapping at least one note in the first set of notes to at least one note in the second set of notes. In accordance with the present systems, devices, and methods, liberating the note-mapping transformation in this way allows considerably more note variations to be explored and implemented. In some implementations, if any of the resulting note-mappings are dissonant or otherwise musically unpleasant when played in the variation of the music data object then the corresponding dissonant/unpleasant notes may be subsequently harmonized as described in FIG. 4.

Figure 4:
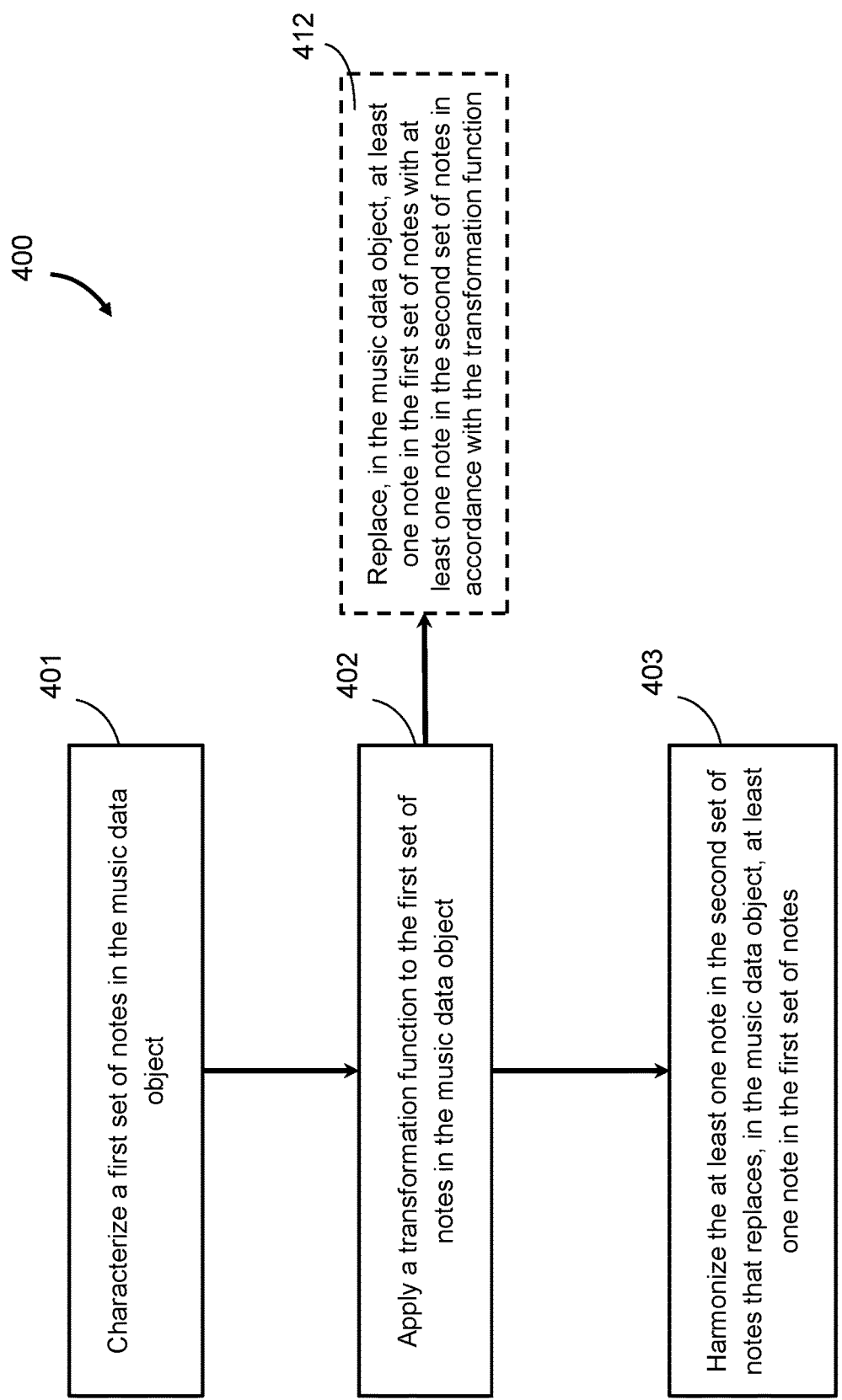
FIG. 4 is a flow diagram showing another exemplary computer-implemented method of generating a variation of a music data object in accordance with the present systems, devices, and methods.

FIG. 4 is a flow diagram showing another exemplary computer-implemented method 400 of generating a variation of a music data object in accordance with the present systems, devices, and methods. Method 400 includes all of the acts and sub-acts of method 200 as well as at least one additional act. That is, method 400 includes act 401 that is substantially the same as act 201 from method 200 and act 402 that is substantially the same as act 202 from method 200, and act 402 of method 400 also includes sub-act 412 that is substantially the same as sub-act 212 of act 202 from method 200. However, method 400 also includes act 403 that is not included in method 200. Thus, method 400 includes three acts 401, 402, and 403, and one sub-act 412, though those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations.

At 401, a first set of notes in the music data object is characterized substantially as described in relation to act 201 of method 200.

At 402, a transformation is applied to the first set of notes in the music data object substantially as described in relation to act 202 of method 200.

At 412, at least one note in the first set of notes is replaced, in the music data object, with at least one note in the second set of notes in accordance with the transformation substantially as described in relation to sub-act 212 of method 200.

At 403, the at least one note in the second set of notes that replaces, in the music data object, at least one note in the first set of notes is harmonized (e.g., by at least one processor). In general, harmonizing the at least one note in the second set of notes that replaces, in the music data object, at least one note in the first set of notes may include changing the at least one note to a different note that better harmonizes with (or, "musically fits in with") other notes within the vicinity of the at least one note (e.g., within 1, 2, 3, 4, or 5 notes of the at least one note in the corresponding note sequence). Advantageously, the different note to which the at least one note is changed may be a nearest neighbor (i.e., as close as possible in pitch/frequency) to the at least one note to adhere as closely as possible to the note-mapping transformation.

In some implementations, a note variation that is found to be out of harmony with other notes in its vicinity and is therefore subject to harmonization at 403 may be brought into harmony with other notes in its vicinity by being changed to one of a range of different notes. For example, the note variation may be equidistant between two equally acceptable new note alternatives, in terms of harmony. In such situations, a convention may be adopted, such as "map to the lowest note alternative."

In some implementations, two or more consecutive note variations may be found to be out of harmony with other notes in their vicinity and, in the absence of any further accommodation or adjustment, both of the consecutive "unharmonious" note variations might be changed to a same note. Such a situation would replace two unique notes with a single repeated note, which can sometimes be musically displeasing. For example, a situation may arise where two consecutive note variations, X and Y, are both out of harmony with other notes in their vicinity and the nearest neighbor to each of X and Y that is in harmony with other notes in their vicinity is the same note, Z. In this case, in the absence of any further accommodation the harmonization process at 403 might replace both X and Y with Z, producing a Z,Z repetition in the overall variation. In accordance with the present systems, devices, and methods, such repetitions may be avoided by checking for repetitions (e.g., as a sub-act of 403) and, if a repetition is found, implementing a convention such as: "in the case of a note repetition, leave the first note as is and map the second note to the next-nearest neighbor that is in harmony with other notes in the vicinity".

In accordance with the present systems, devices, and methods, there are multiple ways to characterize how the note variation and harmonization processes are decoupled from one another. As an example, the note-mapping transformation applied at 202, 302, and 402 may ignore conventions of musicality and harmony. In this case, the harmonization process performed at 403 of method 400 may include applying conventions of musicality and harmony to the at least one note in the second set of notes that replaces, in the music data object, at least one note in the first set of notes. The conventions of musicality and harmony may be applied to the at least one note based at least in part on, for example, a placement of the at least one note in relation to other notes in the music data object. In some implementations, "applying conventions of musicality and harmony" to a note may include adjusting or changing the note to a different note (e.g., a nearest neighbor note) that better satisfies the constraints of musicality and harmony in relation to the other notes in the music data object.

The concepts of a note "better satisfying the constraints of musicality and harmony" and/or being "in musical harmony with" another note, and the processes by which such may be achieved, would generally be understood be a person of skill in the art of music composition. Some illustrative examples or processes that may, at least in part, achieve the foregoing include, without limitation: adjusting a note to be within the key of a music data object, adjusting a note to be within the scale of other notes, adjusting a note to be within a key and scale of other notes, adjusting a note to complete a chord with other notes, adjusting a note to be within a chord progression in the music data object, adjusting a note to be within a particular musical cadence, and/or adjusting a note to complete a particular interval in relation to at least one temporally coincident or neighbor note.

Figure 5:
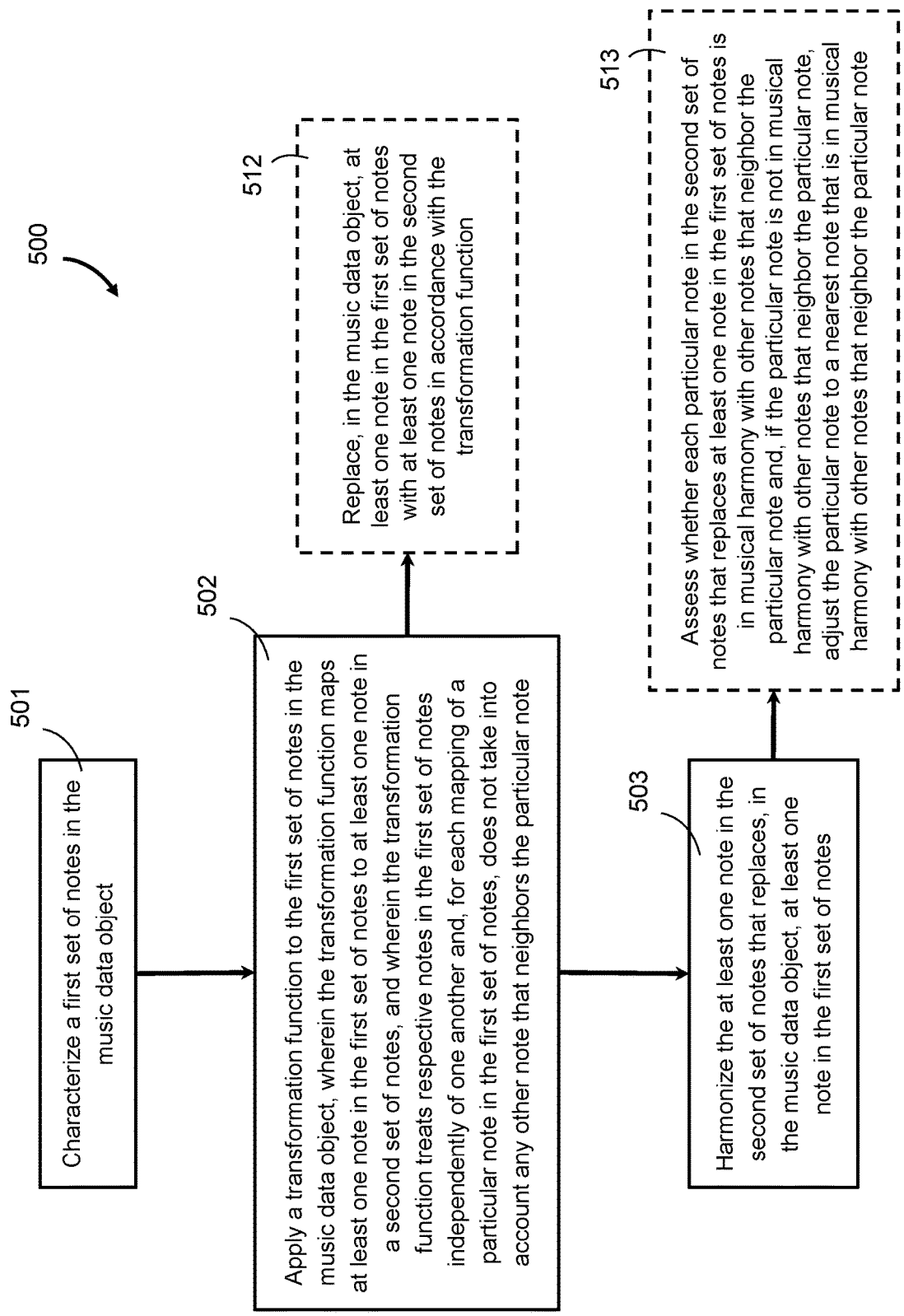
FIG. 5 is a flow diagram showing another exemplary computer-implemented method of generating a variation of a music data object in accordance with the present systems, devices, and methods.

Another example of how note variation and harmonization processes may be decoupled from one another in accordance with the present systems, devices, and methods is illustrated in FIG. 5.

FIG. 5 is a flow diagram showing another exemplary computer-implemented method 500 of generating a variation of a music data object in accordance with the present systems, devices, and methods. Method 500 includes three acts 501, 502, and 503, and two sub-act 512 and 513, though those of skill in the art will appreciate that in alternative implementations certain acts/sub-acts may be omitted and/or additional acts/sub-acts may be added. Those of skill in the art will also appreciate that the illustrated order of the acts/sub-acts is shown for exemplary purposes only and may change in alternative implementations.

At 501, a first set of notes in the music data object is characterized substantially as described in relation to act 201 of method 200.

At 502, a transformation is applied to the first set of notes in the music data object. In a similar way to that described for act 202 of method 200, at 502 the transformation maps at least one note in the first set of notes to at least one note in a second set of notes; however, in the specific implementation of method 500, at 502 the transformation treats respective notes in the first set of notes independently of one another and, for each mapping of a particular note in the first set of notes, does not take into account any other note that neighbors the particular note. As an alternative to, or in conjunction with, the foregoing, in some implementations the transformation treats respective notes in the first set of notes independently of one another and, for each mapping of a particular note in the first set of notes, does not take into account any other note that temporally coincides with the particular note.

Similar to the relationship between act 202 and sub-act 212 of method 200, generally applying the transformation at 502 of method 500 includes sub-act 512. At 512, at least one note in the first set of notes in replaced, in the music data object, with at least one note in the second set of notes in accordance with the transformation.

At 503, the at least one note in the second set of notes that replaces at least one note in the first set of notes is harmonized similar to as described at 403 of method 400; however, since 502 of method 500 gives a specific example of a note-mapping transformation, 503 of method 500 also gives a specific example of a related harmonization process. Thus, the harmonization process at 503 includes sub-act 513.

At 513, whether each particular note in the second set of notes that replaces at least one note in the first set of notes is in musical harmony with other notes that neighbor the particular note is assessed (e.g., by at least one processor). If the particular note is in musical harmony with other notes that neighbor the particular note then no further harmonization processing is required or generally applied for the particular note; however, if the particular note is not in musical harmony with other notes that neighbor the particular note then the particular note is adjusted to (e.g., changed to or replaced by) a nearest note that is in musical harmony with other notes that neighbor the particular note. As an alternative to, or in conjunction with, the foregoing, in some implementations whether each particular note in the second set of notes that replaces at least one note in the first set of notes is in musical harmony with other notes that temporally coincide with the particular note is assessed (e.g., by at least one processor). If the particular note is in musical harmony with other notes that temporally coincide with the particular note then no further harmonization processing is required or generally applied for the particular note; however, if the particular note is not in musical harmony with other notes that temporally coincide with the particular note then the particular note is adjusted to (e.g., changed to or replaced by) a nearest note that is in musical harmony with other notes that temporally coincide with the particular note.

The various methods described herein may be combined, either in whole or in part, to produce additional implementations. For example, in some implementations of method 400 or method 500, the variation of the music data object may be encoded with at least one note in the second set of notes in place of at least one note in the first set of notes (i.e., as described at 303 of method 300) after the harmonization process at 403/503 is complete.

A person of skill in the art will appreciate the various "transformations" described throughout the present systems, devices, and methods may be implemented or embodied in different ways. In some implementations, a transformation may be defined or encoded in processor-executable instructions and/or data stored in a non-transitory processor-readable storage medium that is communicatively coupled to at least one processor, and applying the transformation may include executing the processor-executable instructions and/or data by the at least one processor, and wherein executing the processor-executable instructions and/or data by the at least one processor causes the at least one processor to map at least one note in the first set of notes to at least one note in a second set of notes as defined or dictated by (i.e., in accordance with) the transformation. In some implementations, a transformation may include or take the form of a lookup table with the first set of notes in a first column and the second set of notes in a second column and each mapping from a note in the first set of notes to a note in the second set of notes characterized by a respective row in the lookup table.

The various implementations described herein improve the functioning of computer systems for the specific practical application of computer-based music composition, including but not limited to automated or algorithmic composition of music. For example, the algorithmic note variation (e.g., 402, 502) that does not account for conventions of musicality and harmony allows an unconstrained range of notes to be explored or called upon when applying a note variation, while the subsequent harmonization (e.g., 403, 503) ensures that the end result will still be harmonically aesthetically pleasing to a listener. Overall, this combination can improve the functioning of a computer-based music composition system by producing interesting, unexpected, experimental, and/or novel musical variations that stand out relative to variations generated by conventional computer systems.

Encoding various components of a musical composition in separate discrete data objects introduces a modularity that enables exceptional (relative to other approaches in the art) algorithmic control to set, vary, manipulate, and rearrange the various components of the composition. This modularity may be taken advantage of in algorithmic composition to produce new and improved software and applications for computer-based music creation/variation that output more sophisticated and enjoyable musical results. But modularity is just one example of how the present systems, devices, and methods improve the functioning of computer systems for automatic music generation. There are many other ways in which the present systems, devices, and methods advantageously improve the use of computers for generating music, including without limitation: enabling various component parameters (e.g., note timing and beat timing) to be defined and manipulated independently of one another; enabling certain parametric relationships (e.g., timing relationships) to be preserved across different components and/or parameters while other parametric relationships (e.g., note sequences) are varied; and enabling musical compositions to be defined and manipulated using the higher-level concepts of musical theory with which most composers and musicians are already familiar. These and other advantages are all achieved within a data file (e.g., the .hum file) that is well-suited for communication between computer systems and electronic instruments.

The various implementations described herein often make reference to "computer-based," "computer-implemented," "at least one processor," "a non-transitory processor-readable storage medium," and similar computer-oriented terms. A person of skill in the art will appreciate that the present systems, devices, and methods may be implemented using or in association with a wide range of different hardware configurations, including localized hardware configurations (e.g., a desktop computer, laptop, smartphone, or similar) and/or distributed hardware configurations that employ hardware resources located remotely relative to one another and communicatively coupled through a network, such as a cellular network or the internet. For the purpose of illustration, exemplary computer systems suitable for implementing the present systems, devices, and methods are provided in FIG. 6.

FIG. 6 is an illustrative diagram of a processor-based computer system 600 suitable at a high level for performing the various computer-implemented methods described in the present systems, devices, and methods. Although not required, some portion of the implementations are described herein in the general context of data, processor-executable instructions or logic, such as program application modules, objects, or macros executed by one or more processors. Those skilled in the art will appreciate that the described implementations, as well as other implementations, can be practiced with various processor-based system configurations, including handheld devices, such as smartphones and tablet computers, multiprocessor systems, microprocessor-based or programmable consumer electronics, personal computers ("PCs"), network PCs, minicomputers, mainframe computers, and the like.

Processor-based computer system 600 includes at least one processor 601, a non-transitory processor-readable storage medium or "system memory" 602, and a system bus 610 that communicatively couples various system components including the system memory 602 to the processor(s) 601. Processor-based computer system 601 is at times referred to in the singular herein, but this is not intended to limit the implementations to a single system, since in certain implementations there will be more than one system or other networked computing device(s) involved. Non-limiting examples of commercially available processors include, but are not limited to: Core microprocessors from Intel Corporation, U.S.A., PowerPC microprocessor from IBM, ARM processors from a variety of manufacturers, Sparc microprocessors from Sun Microsystems, Inc., PA-RISC series microprocessors from Hewlett-Packard Company, and 68xxx series microprocessors from Motorola Corporation.

The processor(s) 601 of processor-based computer system 600 may be any logic processing unit, such as one or more central processing units (CPUs), microprocessors, digital signal processors (DSPs), application-specific integrated circuits (ASICs), field programmable gate arrays (FPGAs), and/or the like. Unless described otherwise, the construction and operation of the various blocks shown in FIG. 6 may be presumed to be of conventional design. As a result, such blocks need not be described in further detail herein as they will be understood by those skilled in the relevant art.

The system bus 610 in the processor-based computer system 600 may employ any known bus structures or architectures, including a memory bus with memory controller, a peripheral bus, and/or a local bus. The system memory 602 includes read-only memory ("ROM") 621 and random access memory ("RAM") 622. A basic input/output system ("BIOS") 623, which may or may not form part of the ROM 621, may contain basic routines that help transfer information between elements within processor-based computer system 600, such as during start-up. Some implementations may employ separate buses for data, instructions and power.

Processor-based computer system 600 (e.g., system memory 602 thereof) may include one or more solid state memories, for instance, a Flash memory or solid state drive (SSD), which provides nonvolatile storage of processor-executable instructions, data structures, program modules and other data for processor-based computer system 600. Although not illustrated in FIG. 6, processor-based computer system 600 may, in alternative implementations, employ other non-transitory computer- or processor-readable storage media, for example, a hard disk drive, an optical disk drive, or a memory card media drive.

Program modules in processor-based computer system 600 may be stored in system memory 602, such as an operating system 624, one or more application programs 625, program data 626, other programs or modules 627, and drivers 628.

The system memory 602 in processor-based computer system 600 may also include one or more communications program(s) 629, for example, a server and/or a Web client or browser for permitting processor-based computer system 600 to access and exchange data with other systems such as user computing systems, Web sites on the Internet, corporate intranets, or other networks as described below. The communications program(s) 629 in the depicted implementation may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Google (Chrome), Mozilla (Firefox), Apple (Safari), and Microsoft (Internet Explorer).

While shown in FIG. 6 as being stored locally in system memory 602, operating system 624, application programs 625, program data 626, other programs/modules 627, drivers 628, and communication program(s) 629 may be stored and accessed remotely through a communication network or stored on any other of a large variety of non-transitory processor-readable media (e.g., hard disk drive, optical disk drive, SSD and/or flash memory).

Processor-based computer system 600 may include one or more interface(s) to enable and provide interactions with a user, peripheral device(s), and/or one or more additional processor-based computer system(s). As an example, processor-based computer system 610 includes interface 630 to enable and provide interactions with a user of processor-based computer system 600. A user of processor-based computer system 600 may enter commands, instructions, data, and/or information via, for example, input devices such as computer mouse 631 and keyboard 632. Other input devices may include a microphone, joystick, touch screen, game pad, tablet, scanner, biometric scanning device, wearable input device, and the like. These and other input devices (i.e., "I/O devices") are communicatively coupled to processor(s) 601 through interface 630, which may include one or more universal serial bus ("USB") interface(s) that communicatively couples user input to the system bus 610, although other interfaces such as a parallel port, a game port or a wireless interface or a serial port may be used. A user of processor-based computer system 600 may also receive information output by processor-based computer system 600 through interface 630, such as visual information displayed by a display 633 and/or audio information output by one or more speaker(s) 634. Monitor 633 may, in some implementations, include a touch screen.

As another example of an interface, processor-based computer system 600 includes network interface 640 to enable processor-based computer system 600 to operate in a networked environment using one or more of the logical connections to communicate with one or more remote computers, servers and/or devices (collectively, the "Cloud" 641) via one or more communications channels. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, network interface 640 may include one or more wired or wireless communications interfaces, such as network interface controllers, cellular radios, WI-FI radios, and/or Bluetooth radios for establishing communications with the Cloud 641, for instance, the Internet or a cellular network.

In a networked environment, program modules, application programs or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, processor(s) 601, system memory 602, interface 630, and network interface 640 are illustrated as communicatively coupled to each other via the system bus 610, thereby providing connectivity between the above-described components. In alternative implementations, the above-described components may be communicatively coupled in a different manner than illustrated in FIG. 6. For example, one or more of the above-described components may be directly coupled to other components, or may be coupled to each other via intermediary components (not shown). In some implementations, system bus 610 may be omitted with the components all coupled directly to each other using suitable connections.

In accordance with the present systems, devices, and methods, processor-based computer system 600 may be used to implement or in association with any or all of methods 100, 200, 300, 400, and/or 500 described herein and/or to define, encode, and/or manipulate any or all of the music data objects and/or transformations described herein. Where the descriptions of methods 100, 200, 300, 400, and 500 make reference to an act being performed by at least one processor, such act may be performed by processor(s) 601 of computer system 600. Where the descriptions of methods 100, 200, 300, 400, and 500 make reference to an act being performed by, performed on, or otherwise involving a non-transitory processor-readable storage medium, such act may be performed by, performed on, or otherwise involve system memory 602 of computer system 600.

Computer system 600 is an illustrative example of a system for performing all or portions of the various methods described herein, the system comprising at least one processor 601, at least one non-transitory processor-readable storage medium 602 communicatively coupled to the at least one processor 601 (e.g., by system bus 610), and the various other hardware and software components illustrated in FIG. 6 (e.g., operating system 624, mouse 631, etc.). In particular, in order to enable system 600 to implement the present systems, devices, and methods, system memory 602 stores a computer program product 650 comprising processor-executable instructions and/or data 651 that, when executed by processor(s) 601, cause processor(s) 601 to perform the various processor-based acts of methods 100, 200, 300, 400, and/or 500 as described herein. In the illustrated implementation of computer system 600, system memory 602 also stores at least one music data object 652 which is accessed by computer program product 650.

Throughout this specification and the appended claims, the term "computer program product" is used to refer to a package, combination, or collection of software comprising processor-executable instructions and/or data that may be accessed by (e.g., through a network such as cloud 641) or distributed to and installed on (e.g., stored in a local non-transitory processor-readable storage medium such as system memory 602) a computer system (e.g., computer system 600) in order to enable certain functionality (e.g., application(s), program(s), and/or module(s)) to be executed, performed, or carried out by the computer system.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, unless the specific context requires otherwise the term "note" is generally used to refer to a musical note (such as Ab, A, A #, Bb, B, C, C #, Db, D, D #, Eb, E, F, F #, Gb, G, G # (of any octave), and theoretical notes such as Cb, which is enharmonic to B) and is inclusive of rests (i.e., a note with a certain timing but no pitch or volume). A person of skill in the art will appreciate that the "parameters" of a note, or "note parameters," may include any or all concepts used to characterize notes in modern musical theory, including without limitation: pitch, start time, stop time, duration, volume, attack, reverb, decay, sustain, and instrument (e.g., tone, timbre, relative harmonics, and the like). Thus, a "note data object" is a data object that encodes a note, including its applicable note parameters.

A musical composition may include percussion events that have no tonal pitch but are used to impart rhythm. Throughout this specification and the appended claims, unless the specific context requires otherwise the term "note" is inclusive of percussion events. A percussion event may be defined or characterized by note parameters that generally do not include a pitch and generally specify a percussion instrument as the instrument.

Throughout this specification and the appended claims, reference is often made to a "track." Unless the specific context requires otherwise, the term track is used herein to refer to a collection or sequence of notes that are all "played by" the same instrument in a musical composition. For example, a musical composition that is for or by a single instrument may have only one track, but a musical composition that is for or by multiple instruments concurrently may have multiple tracks that are temporally overlaid on one another. Each respective bar of a musical composition may include multiple tracks, where each track provides the sequence of notes of a respective instrument throughout the duration of that bar.

Throughout this specification and the appended claims, unless the specific context requires otherwise the term "bar" is generally used to refer to a musical bar; i.e., a portion of time comprising a set number of beats from a musical composition. The number of beats in a bar depends on the time signature for the musical composition. A person of skill in the art will appreciate that the "parameters" of a bar, or "bar parameters," may include any or all concepts used to characterize bars in modern musical theory, including without limitation: bar index, time signature, beats per minute, duration, start time, stop time, beat times, key, scale, chords, tracks, sequence of notes, and (if applicable) sequence of percussion events.

Throughout this specification and the appended claims, the term "first" and related similar terms, such as "second," "third," and the like, are often used to identify or distinguish one element or object from other elements or objects (as in, for example, "first note" and "first bar"). Unless the specific context requires otherwise, such uses of the term "first," and related similar terms such as "second," "third," and the like, should be construed only as distinguishing identifiers and not construed as indicating any particular order, sequence, chronology, or priority for the corresponding element(s) or object(s). For example, unless the specific context requires otherwise, the term "first note" simply refers to one particular note among other notes and does not necessarily require that such one particular note be positioned ahead of or before any other note in a sequence of notes; thus, a "first note" of a musical composition or bar is one particular note from the musical composition or bar and not necessarily the lead or chronologically-first note of the musical composition or bar.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A computer-implemented method of generating a variation of a music data object, the method comprising:
characterizing a first set of notes in the music data object;
applying a transformation that ignores conventions of musicality and harmony to the first set of notes in the music data object, wherein the transformation maps at least one note in the first set of notes to at least one note in a second set of notes, and wherein applying the transformation that ignores conventions of musicality and harmony to the first set of notes in the music data object includes replacing, in the music data object, the at least one note in the first set of notes with the at least one note in the second set of notes without taking into account a relative placement of the at least one note in the first set of notes in relation to other notes in the first set of notes that temporally coincide with or neighbor the at least one note in the first set of notes; and
harmonizing the at least one note in the second set of notes that replaces the at least one note in the first set of notes, wherein harmonizing the at least one note in the second set of notes that replaces the at least one note in the first set of notes includes adjusting the at least one note in the second set of notes that replaces the at least one note in the first set of notes to apply conventions of musicality and harmony thereto, based at least in part on a relative placement of the at least one note in the second set of notes in relation to other notes in the second set of notes that temporally coincide with or neighbor the at least one note in the second set of notes.

2. The method of claim 1 wherein applying the transformation that ignores conventions of musicality and harmony to the first set of notes in the music data object includes applying, to the first set of notes in the music data object, a transformation that treats respective notes in the first set of notes independently of one another.

3. The method of claim 1 wherein characterizing the first set of notes in the music data object includes characterizing a first set of unique notes in the music data object.

4. The method of claim 3 wherein applying the transformation that ignores conventions of musicality and harmony to the first set of notes in the music data object includes applying, to the first set of unique notes in the music data object, a transformation that maps each respective unique note in the first set of unique notes to a respective unique note in the second set of notes.

5. The method of claim 3 wherein applying the transformation that ignores conventions of musicality and harmony to the first set of notes in the music data object includes applying, to the first set of unique notes in the music data object, a transformation that maps at least two respective unique notes in the first set of unique notes to a same note in the second set of notes.

6. The method of claim 3 wherein applying the transformation that ignores conventions of musicality and harmony to the first set of notes in the music data object includes applying, to the first set of unique notes in the music data object, a transformation that maps each of at least two respective instances of a same unique note in the first set of unique notes to a respective unique note in the second set of notes.

7. The method of claim 3 wherein applying the transformation that ignores conventions of musicality and harmony to the first set of notes in the music data object includes applying, to the first set of unique notes in the music data object, a transformation that maps at least one unique note in the first set of unique notes to at least two respective unique notes in the second set of notes.

8. The method of claim 1 wherein harmonizing the at least one note in the second set of notes that replaces the at least one note in the first set of notes includes assessing whether the at least one note in the second set of notes is in musical harmony with other notes in the second set of notes that temporally coincide with the at least one note in the second set of notes and, if the at least one note in the second set of notes is not in musical harmony with other notes in the second set of notes that temporally coincide with the at least one note in the second set of notes, adjusting the at least one note in the second set of notes to a nearest note that is in musical harmony with other notes in the second set of notes that temporally coincide with the at least one note in the second set of notes.

9. The method of claim 1 wherein harmonizing the at least one note in the second set of notes that replaces the at least one note in the first set of notes includes assessing whether the at least one note in the second set of notes is in musical harmony with other notes in the second set of notes that neighbor the at least one note in the second set of notes and, if the at least one note in the second set of notes is not in musical harmony with other notes that neighbor the at least one note in the second set of notes, adjusting the at least one note in the second set of notes to a nearest note that is in musical harmony with other notes in the second set of notes that neighbor the at least one note in the second set of notes.

10. The method of claim 1, further comprising:
encoding the variation of the music data object with the at least one note in the second set of notes in place of the at least one note in the first set of notes.

11. The method of claim 1 wherein the music data object is selected from a group consisting of: a bar data object, a track data object, a segment data object, and a Music [Segments{ }, barsPerSegment{ }] data object.

12. The method of claim 1 wherein adjusting the at least one note in the second set of notes that replaces the at least one note in the first set of notes to apply conventions of musicality and harmony thereto includes at least one adjustment selected from a group consisting of: adjusting the at least one note in the second set of notes to be within a key of the music data object; adjusting the at least one note in the second set of notes to be within a scale of other notes in the music data object; adjusting the at least one note in the second set of notes to be within a key and scale of other notes in the music data object; adjusting the at least one note in the second set of notes to complete a chord with other notes in the music data object; adjusting the at least one note in the second set of notes to be within a chord progression in the music data object; adjusting the at least one note in the second set of notes to be within a particular musical cadence; and adjusting the at least one note in the second set of notes to complete a particular interval in relation to at least one temporally coincident or neighbor note in the music data object.

13. A system for generating a variation of a music data object, the system comprising:
at least one processor; and
a non-transitory processor-readable storage medium communicatively coupled to the at least one processor, the non-transitory processor-readable storage medium storing the music data object and processor-executable instructions and/or data that, when executed by the at least one processor, cause the at least one processor to:
characterize a first set of notes in the music data object;
apply a transformation that ignores conventions of musicality and harmony to the first set of notes in the music data object, wherein the transformation maps at least one note in the first set of notes to at least one note in a second set of notes, and wherein the processor-executable instructions and/or data that, when executed by the at least one processor, cause the at least one processor to apply the transformation that ignores conventions of musicality and harmony to the first set of notes in the music data object, cause the at least one processor to replace, in the music data object, the at least one note in the first set of notes with the at least one note in the second set of notes without taking into account a relative placement of the at least one note in the first set of notes in relation to other notes in the first set of notes that temporally coincide with or neighbor the at least one note in the first set of notes; and
harmonize the at least one note in the second set of notes that replaces the at least one note in the first set of notes, wherein the processor-executable instructions and/or data that, when executed by the at least one processor, cause the at least one processor to harmonize the at least one note in the second set of notes that replaces the at least one note in the first set of notes, cause the at least one processor to adjust the at least one note in the second set of notes that replaces the at least one note in the first set of notes to apply conventions of musicality and harmony thereto, based at least in part on a relative placement of the at least one note in the second set of notes in relation to other notes in the second set of notes that temporally coincide with or neighbor the at least one note in the second set of notes.

14. The system of claim 13 wherein:
the processor-executable instructions and/or data that, when executed by the at least one processor, cause the at least one processor to apply the transformation that ignores conventions of musicality and harmony to the first set of notes in the music data object, cause the at least one processor to apply, to the first set of notes in the music data object, a transformation that treats respective notes in the first set of notes independently of one another; and
the processor-executable instructions and/or data that, when executed by the at least one processor, cause the at least one processor to harmonize the at least one note in the second set of notes that replaces the at least one note in the first set of notes, cause the at least one processor to assess whether the at least one note in the second set of notes is in musical harmony with other notes in the second set of notes that neighbor the at least one note in the second set of notes and, if the at least one note in the second set of notes is not in musical harmony with other notes in the second set of notes that neighbor the at least one note in the second set of notes, adjust the at least one note in the second set of notes to a nearest note that is in musical harmony with other notes in the second set of notes that neighbor the at least one note in the second set of notes.

15. The system of claim 13 wherein:
the processor-executable instructions and/or data that, when executed by the at least one processor, cause the at least one processor to apply the transformation that ignores conventions of musicality and harmony to the first set of notes in the music data object, cause the at least one processor to apply, to the first set of notes in the music data object, a transformation that treats respective notes in the first set of notes independently of one another; and
the processor-executable instructions and/or data that, when executed by the at least one processor, cause the at least one processor to harmonize the at least one note in the second set of notes that replaces the at least one note in the first set of notes, cause the at least one processor to assess whether the at least one note in the second set of notes is in musical harmony with other notes in the second set of notes that temporally coincide with the at least one note in the second set of notes and, if the at least one note in the second set of notes is not in musical harmony with other notes in the second set of notes that temporally coincide with the at least one note in the second set of notes, adjust the at least one note in the second set of notes to a nearest note that is in musical harmony with other notes in the second set of notes that temporally coincide with the at least one note in the second set of notes.

16. A computer program product for generating a variation of a music data object, the computer program product comprising:
a non-transitory processor-readable storage medium storing processor-executable instructions and/or data that, when executed by at least one processor communicatively coupled to the non-transitory processor-readable storage medium, cause the at least one processor to:

characterize a first set of notes in the music data object;
apply a transformation that ignores conventions of musicality and harmony to the first set of notes in the music data object, wherein the transformation maps at least one note in the first set of notes to at least one note in a second set of notes, and wherein the processor-executable instructions and/or data that, when executed by the at least one processor, cause the at least one processor to apply the transformation that ignores conventions of musicality and harmony to the first set of notes in the music data object, cause the at least one processor to replace, in the music data object, the at least one note in the first set of notes with the at least one note in the second set of notes without taking into account a relative placement of the at least one note in the first set of notes in relation to other notes in the first set of notes that temporally coincide with or neighbor the at least one note in the first set of notes; and
harmonize the at least one note in the second set of notes that replaces the at least one note in the first set of notes, wherein the processor-executable instructions and/or data that, when executed by the at least one processor, cause the at least one processor to harmonize the at least one note in the second set of notes that replaces the at least one note in the first set of notes, cause the at least one processor to adjust the at least one note in the second set of notes that replaces the at least one note in the first set of notes to apply conventions of musicality and harmony thereto, based at least in part on a relative placement of the at least one note in the second set of notes in relation to other notes in the second set of notes that temporally coincide with or neighbor the at least one note in the second set of notes.

17. The computer program product of claim 16 wherein:
the processor-executable instructions and/or data that, when executed by the at least one processor, cause the at least one processor to apply the transformation that ignores conventions of musicality and harmony to the first set of notes in the music data object, cause the at least one processor to apply, to the first set of notes in the music data object, a transformation that treats respective notes in the first set of notes independently of one another; and
the processor-executable instructions and/or data that, when executed by the at least one processor, cause the at least one processor to harmonize the at least one note in the second set of notes that replaces the at least one note in the first set of notes, cause the at least one processor to assess whether the at least one note in the second set of notes is in musical harmony with other notes in the second set of notes that neighbor the at least one note in the second set of notes and, if the at least one note in the second set of notes is not in musical harmony with other notes in the second set of notes that neighbor the at least one note in the second set of notes, adjust the at least one note in the second set of notes to a nearest note that is in musical harmony with other notes in the second set of notes that neighbor the at least one note in the second set of notes.

18. The computer program product of claim 16 wherein:
the processor-executable instructions and/or data that, when executed by the at least one processor, cause the at least one processor to apply the transformation that ignores conventions of musicality and harmony to the first set of notes in the music data object, cause the at least one processor to apply, to the first set of notes in the music data object, a transformation that treats respective notes in the first set of notes independently of one another; and
the processor-executable instructions and/or data that, when executed by the at least one processor, cause the at least one processor to harmonize the at least one note in the second set of notes that replaces the at least one note in the first set of notes, cause the at least one processor to assess whether the at least one note in the second set of notes is in musical harmony with other notes in the second set of notes that temporally coincide with the at least one note in the second set of notes and, if the at least one note in the second set of notes is not in musical harmony with other notes in the second set of notes that temporally coincide with the at least one note in the second set of notes, adjust the at least one note in the second set of notes to a nearest note that is in musical harmony with other notes in the second set of notes that temporally coincide with the at least one note in the second set of notes.

* * * * *